United States Patent [19]

Löfgren

[11] Patent Number: 5,514,434

[45] Date of Patent: May 7, 1996

[54] PACKAGING LAMINATE POSSESSING GAS AND LIGHT BARRIER PROPERTIES, AND A METHOD OF PRODUCING THE SAME

[75] Inventor: Lars Löfgren, Staffanstorp, Sweden

[73] Assignee: Tetra Laval Holdings & Finance SA, Pully, Switzerland

[21] Appl. No.: 329,836

[22] Filed: Oct. 27, 1994

[30] Foreign Application Priority Data

Oct. 27, 1993 [SE] Sweden ................................ 9303526

[51] Int. Cl.$^6$ .................................................. B29D 22/00
[52] U.S. Cl. .................. 428/36.6; 428/35.8; 428/448; 428/451; 428/461; 428/463; 428/458; 428/480
[58] Field of Search ..................... 428/480, 458, 428/461, 463, 448, 451

[56] References Cited

U.S. PATENT DOCUMENTS 5,084,356  1/1992  Deak et al. .......................... 428/480
5,232,755  8/1993  Komiya et al. ...................... 428/480

Primary Examiner—Edith Buffalow
Attorney, Agent, or Firm—Burns, Doane, Swecker & Mathis

[57] ABSTRACT

A packaging laminate for a package possessing superior gas and light barrier properties is disclosed, and a method of producing the packaging laminate. The packaging laminate includes a layer of a silicon oxide compound serving as gas barrier and a layer of metal serving as light barrier, these layers being deposited by vacuum deposition on each respective layer of plastic serving as carrier, and being permanently bonded to one another through an interjacent layer of adhesive for the formation of the packaging laminate.

By regulating the thickness of the gas and light barrier layers independently of one another, an optional combination of gas and light barrier properties is made possible, whereby the packaging laminate may be more or less "tailor made" for each type of product which is to be packed.

20 Claims, 1 Drawing Sheet

PACKAGING LAMINATE POSSESSING GAS AND LIGHT BARRIER PROPERTIES, AND A METHOD OF PRODUCING THE SAME

TECHNICAL FIELD

The present invention relates to a packaging laminate possessing superior gas and light barrier properties, and a method of producing the packaging laminate.

BACKGROUND ART

Conventional packaging materials for packages of the single-use disposable type generally consist of a plurality of mutually laminated material layers which are together intended to impart to the package the desired mechanical, chemical and other properties. The primary objective of the composition of the packaging materials is to provide the best possible product protection for the product which is to be packed, at the same time the packaging material must be economically viable and easy to produce. In addition, the packaging material must be easy to reform into packages using conventional technology which employs modern, rational packaging machines of the type which form, fill and seal the packages.

Use has long been made within the packaging art of laminated packaging materials (packaging laminates) comprising a configurationally rigid but foldable paper or paperboard layer and outer layers of thermoplastic, preferably polyethylene. In these prior art packaging laminates, the paper or board layer is generally very thick and imparts to the package superior mechanical strength and configurational stability, while the outer thermoplastic layers make the package liquid-tight at the same time as making possible reforming of the packaging laminate into packages by means of so-called heat sealing, in which mutually facing thermoplastic layers are, under the simultaneous application of heat and pressure, brought to surface fusion with one another, for the formation of mechanically strong and liquid-tight sealing joints or seams.

A packaging laminate consisting exclusively of paper or paperboard and polyethylene possesses good mechanical properties and good tightness properties against moisture and liquid, but is almost entirely devoid of tightness properties against gases, for example oxygen gas, which, as a result, may easily penetrate through the packaging walls and come into contact with, and act on, the packed product. In order to avoid such gas contact and gas action on the packed product, it is therefore necessary to supplement the packaging laminate with at least one additional layer of a material which possesses gas barrier properties. One example of such a gas barrier material which is often employed is an aluminium foil (Alifoil) which is applied to the one side of the paper or paperboard layer, between the paper or paperboard layer and one of the outer thermoplastic layers. In itself, an Alifoil is almost absolutely gas-tight, but because of its low level of extensibility, it often happens that the Alifoil cracks in particularly exposed laminate regions during the reforming of the packaging laminate into packages, whereby the desired gas tightness of the package is considerably reduced.

Consequently, for reasons which will readily be appreciated, there has long been a need in the art to find other materials which may replace the conventional Alifoil in the above-described packaging laminate, and one such alternative which already occurs in commercially available packaging laminates is EVOH (an ethyl vinyl alcohol copolymer) which is known, for example, from U.S. Pat. No. Re. 33 376.

Other types of gas barrier polymers have also been proposed, such as polyvinylidene chloride, polyamide, polyester, etc., as well as gas barriers of materials other than plastics, for example silicon oxide.

The above-mentioned alternative gas barrier materials possess very good gas barrier properties but, unlike the Alifoil, do not impart to the packaging laminate barrier properties against light, as may many times be desirable when protecting a packed product in order to be able to store the product for a lengthy period of time while retaining its pristine qualities. Examples of products which are sensitive to the action of both oxygen gas and light and which, therefore, require packages possessing both oxygen gas and light barrier properties are milk, juice, wine, cooking oil etc.

The problem inherent in insufficient light tightness in packaging laminates including a gas barrier material of the above-mentioned type, for example a polymer, is solved according to the prior art technology partly by employing unbleached paper or paperboard which gives at least a certain protection against light penetration into the package. This problem is solved more adequately by supplementing the packaging laminate with a metal layer, for example Alifoil, which in addition strengthens the gas barrier properties of the package.

OBJECTS OF THE INVENTION

One object of the present invention is therefore to obviate the above-described drawbacks inherent in the prior art technology.

A further object of the present invention is to devise a packaging laminate possessing superior gas barrier properties as well as superior light barrier properties, without the employment of Alifoil.

Yet a further object of the present invention is to devise a packaging laminate possessing superior gas and light barrier properties which, in a simple manner, may be adjusted independently of one another in order to be expediently adapted to any particular type of product which is to be packed.

Still a further object of the present invention is to devise a method of producing a packaging laminate possessing superior gas and light barrier properties.

SUMMARY OF THE INVENTION

These and other objects will be attained according to the present invention, a packaging laminate. Preferred embodiments of the packaging laminate according to the present invention are further provided.

The present invention also provides a method of producing a packaging laminate comprising a vacuum-deposited layer of a silicon oxide compound and a vacuum-deposited layer of metal.

By replacing the conventional Alifoil with a thin coating of metal produced by vacuum deposition, and by using at the same time a thin coating of silicon oxide ($SiO_x$) which is likewise produced by vacuum deposition, the packaging laminate according to the present invention gains considerable advantages over the previously described prior art packaging laminates.

A coating of metal produced by vacuum deposition may be rendered much thinner than a metal foil (e.g. Alifoil) for achieving the desired barrier properties, and thus requires less material for its production, whereby material consumption is lower for the metal coating than for the metal foil.

Further, the vacuum deposited metal coating requires less energy for its production than the metal foil, which makes the metal coating even more economically advantageous than the metal foil.

By combining a metal coating and a silicon oxide coating in the packaging laminate according to the present invention, it will also be possible optionally to vary and adjust the gas barrier and light barrier properties, respectively, of the packaging laminate independently of one another in such a manner that the packaging laminate may more or less be "tailor made" for a given type of product which is to be packed.

According to one preferred embodiment of the present invention, the metal coating which is substantially employed to impart light barrier properties to the packaging laminate consists of aluminium which is produced by vacuum deposition and, according to the same preferred embodiment of the invention, the silicon oxide coating creating the oxygen gas barrier consists of a silicon oxide of the general formula $SiO_x$, where x may vary from between 1.8 to 2.2, this likewise being produced by vacuum deposition in a per se known manner. The term "vacuum deposition" is here taken to signify conventional deposition techniques of the type such as plasma deposition, chemical plasma deposition, sputtering etc.

BRIEF DESCRIPTION OF THE DRAWING

The present invention will now be described in greater detail hereinbelow, with particular reference to the accompanying Drawing which shows, solely for purposes of illustration, one example of how a packaging laminate according to the present invention may be produced. It should, however, be pointed out that the present invention is not restricted exclusively to the specific embodiment shown on the Drawing, numerous variations and modifications being possible without departing from the spirit and scope of the general inventive concept as herein disclosed. Such modifications obvious to a person skilled in the art are thus encompassed by the inventive concept as defined in the appended Claims.

The accompanying Drawing thus schematically illustrates how a packaging laminate may be produced according to one preferred, but non-restrictive, embodiment of the present invention.

DESCRIPTION OF ONE EMBODIMENT

Figure 1:
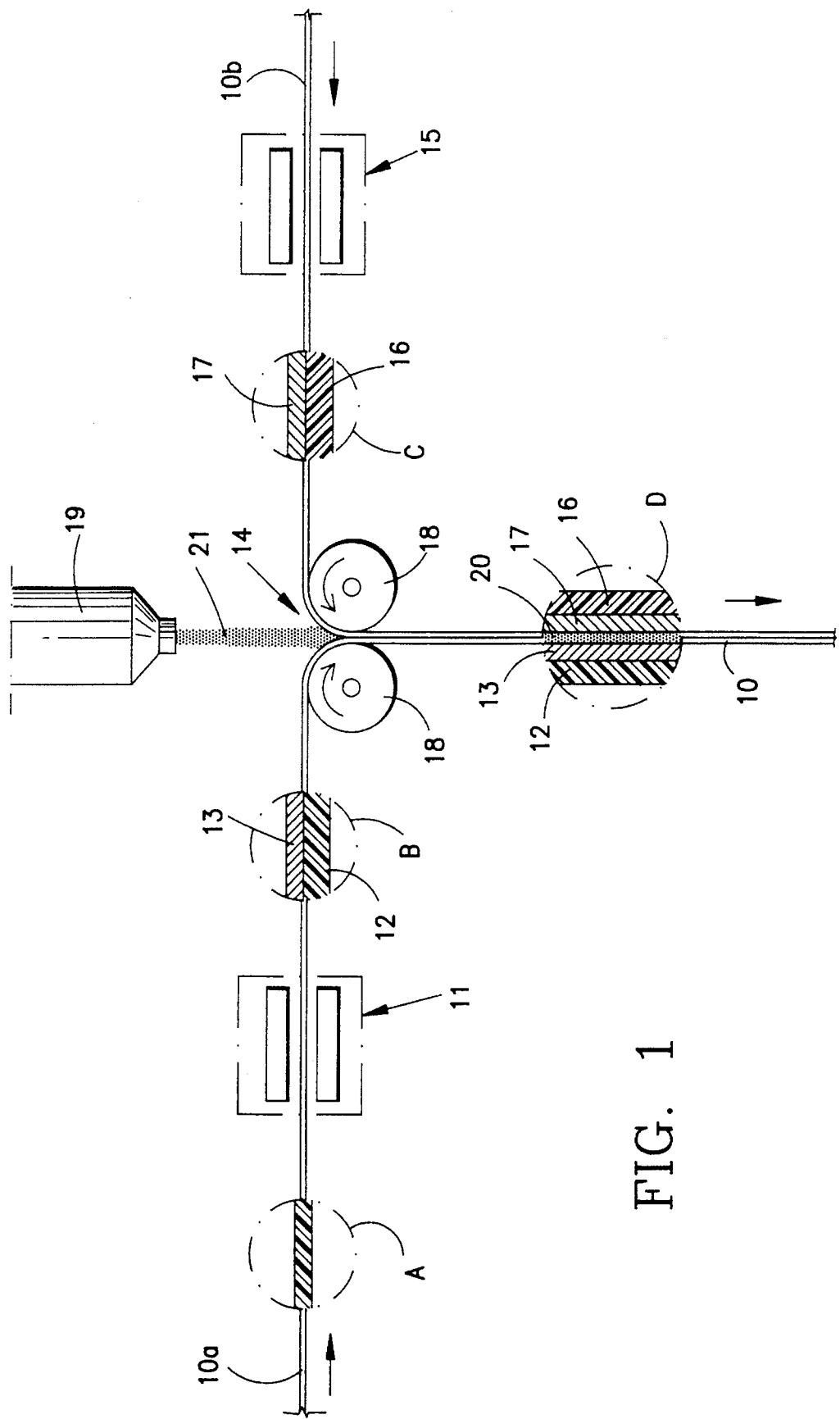

The packaging laminate, which has been given reference numeral 10, is produced from a first web 10a and a second web 10b which are advanced synchronously towards each other in those directions which are intimated by each respective arrow. The first web 10a consists, in the illustrated embodiment, of a single layer (as is apparent from the encircled, enlarged region A) of plastic or other suitable material. Examples of applicable plastics optionally are polyester (PET), oriented polypropylene (OPP), polyethylene (PE), polyamide (PA), polystyrene (PS) and polyvinyl chloride (PVC). The first web 10a is led through a treatment or coating station at 11 of per se known type for coating one side of the web with a thin cohesive layer of metal possessing superior light barrier properties, such as aluminum which also possesses superior gas barrier properties. The method or technique by which the metal coating is applied on the first web 10a at coating station 11 may be a conventional vacuum deposition technique or other known technique which makes for a reliable application of a thin, cohesive metal coating within a thickness range of between 10 and 1000Å, which has proved to be an optimum thickness range for producing a packaging laminate possessing superior barrier properties.

From the station 11, the coated first web 10a, which thus now consists of a plastic layer 12 and a thin metal layer 13 applied on one side of the plastic layer 12 (as shown at the encircled, enlarged region B) is led to a lamination station at 14 where the first web 10a is brought together and permanently bonded with the synchronously advanced second web 10b.

The second web 10b, which, on the Drawing, is advanced from right to left in the intimated direction of the arrow, is led through a treatment or coating station at 15 of conventional type for the application of a thin, continuous coating of silicon oxide against one side of the web 10b. The method or technique by means of which the second web 10b is coated with silicon oxide may also be a conventional vacuum deposition technology or other suitable known technique which makes for the application of a thin continuous silicon oxide coating within a thickness range of between 10 and 2000Å, which has proved to be an optimum thickness range for producing a packaging laminate possessing superior oxygen gas barrier properties.

According to the invention, chemical plasma vacuum deposition (CPVD) is preferred, as giving very dense silicon oxide coatings even in very slight thicknesses within the above disclosed thickness range. One preferred silicon oxide coating consists of a silicon oxide compound of the general formula $SiO_x$, where x may vary from between 1.8 to 2.2.

From the coating station 15, the coated second web 10b, which thus now comprises a plastic layer 16 and a coating 17 of silicon oxide applied to the one side of the plastic coating (as is apparent from the encircled, enlarged region C), is led to the lamination station 14 for combining with the synchronously advanced first web 10a.

The two webs 10a and 10b, with their respective coatings 13 and 17 facing one another, are led through the nip between two rotating rollers 18 at the same time as an adhesive 21 is applied between the two webs within the region of the roller nip. The binder or adhesive 21 which is applied by means of an applicator 19 above the rollers 18 and which may be of any known adhesive capable of binding, with good mechanical strength and good durability, both metal and silicon oxide, is applied in an amount of between 0.1 and 20 g/m$^2$. For practical and economical considerations, this range has proved to be an optimum coating thickness range for the packaging laminate 10 according to the invention.

From the lamination station 14, the packaging laminate 10 which, in the illustrated embodiment, now consists of the plastic layer 12 and metal coating 13 of the first web 10a and the plastic coating 16 and silicon oxide coating 17 of the second web 10b together with the layer 20 of adhesive applied between the coatings 13 and 17 (as is apparent from the encircled, enlarged region D) is led for rolling up onto a magazine reel (not shown) or for producing packages possessing superior gas and light barrier properties in accordance with conventional package production technology.

As was mentioned earlier, it is possible using the packaging laminate according to the invention to produce packages with optional appropriate combinations of gas and light barriers which may more or less be "tailor made" for the relevant type of product which is to be packed. This adaptation of the combination of barrier properties of the package can, according to the invention, be effected by mutual regulation of the thicknesses of each respective coating (i.e., metal coating and silicon oxide coating) applied at the above-described treatment or coating stations 11 and 15.

If, for example, a product requires a high light barrier and a relatively low gas barrier, the thickness of the silicon oxide coating 17 which functions as the actual gas barrier may be reduced within the disclosed thickness range of between 10 and 2000Å, while at the same time the metal layer 13 serving as the actual light barrier may correspondingly be made thicker within the disclosed thickness range of between 10 and 600Å. If, on the other hand, the product requires a high gas barrier but lower light barrier, the applied metal layer 13 may correspondingly be made thinner within the above-mentioned thickness range, while the silicon oxide coating may be made thicker within its thickness range. If the product requires both high gas barrier and light barrier, each respective coating 13 and 17 may logically be made thicker.

The packaging laminate 10 in the present embodiment may be employed for producing flexible, light and gas-tight packages of the bag type. It may also be employed as a prefabricated film for laminating to a configurationally rigid, but foldable core layer, for example a paper or paperboard layer, for producing configurationally stable packages of the type described by way of introduction.

As will have been apparent from the foregoing description, the present invention also makes it possible to produce, in a simple manner and by simple means, a packaging laminate possessing superior gas and light barrier properties which moreover may optionally be adjusted and correlated to one another in such a manner that the packaging laminate may be "tailor made" for a specific type of product which is to be packed.

What is claimed is:

1. A packaging laminate possessing tailor-made superior gas and light barrier properties, comprising a first vacuum-deposited layer of silicon oxide compound having the formula $SiO_x$, where x may be from 1.8 to 2.2, serving as gas barrier, and a second vacuum-deposited layer of metal serving as light barrier, said first and second vacuum-deposited layers being permanently bonded to one another by an interjacent layer of adhesive.

wherein said tailor-made gas and light barrier properties are effected by mutual regulation of said first and second vacuum-deposited layers' respective thicknesses.

2. The packaging laminate as claimed in claim 1, wherein the metal layer consists of aluminum.

3. The packaging laminate as claimed in claim 2, wherein the aluminum layer is of a thickness of between 10 and 1000Å.

4. The packaging laminate as claimed in claim 1, wherein the silicon oxide layer is of a thickness of about 10Å to 2000Å.

5. The packaging laminate as claimed in claim 1, further comprising at least one outer of plastic layer.

6. The packaging laminate as claimed in claim 5, wherein the gas barrier layer is bonded directly to a first outer plastic layer and the light barrier layer is bonded directly to a second outer plastic layer.

7. The packaging laminate as claimed in claim 6, wherein said first and second outer plastic layers each consist essentially of a plastic which has been selected from the group consisting of polypropylene, polyester, polyethylene, polyamide, polystyrene and polyvinyl chloride.

8. The packaging laminate as claimed in claim 1, wherein said interjacent layer of adhesive is of a thickness of about 0.1–20 g/m².

9. A method of producing a packaging laminate possessing tailor-made superior gas and light barrier properties, wherein a first web of plastic, having first and second sides, is coated on its first side with a layer of metal which is deposited by vacuum deposition; wherein a second web of plastic, having first and second sides, is coated on its first side with a layer of silicon oxide which is deposited by vacuum deposition; and wherein the thus coated webs are brought together and permanently bonded to one another with their respective coated sides facing one another by means of an intermediate layer of adhesive which is applied between the webs for the formation of the finished packaging laminate.

10. A packaging laminate possessing tailor-made superior gas and light barrier properties, comprising:

a first plastic layer having first and second sides and a silicon oxide coating vacuum-deposited on said first side, said silicon oxide having the formula $SiO_x$, where x may be from 1.8 to 2.2, and said silicon oxide coating serving as a gas barrier;

a second plastic layer having first and second sides and a metal coating vacuum-deposited on said first side, said metal coating serving as a light barrier; and an intermediate layer of adhesive bonding said silicon oxide coating to said metal coating, wherein said tailor-made gas and light barrier properties are effected by mutual regulation of said first and second vacuum-deposited layers' respective thicknesses.

11. The packaging laminate of claim 10, wherein said metal coating is in a thickness of about 10–1000Å.

12. The packaging laminate of claim 10, wherein said silicon oxide coating is of a thickness of about 10–2000Å.

13. The packaging laminate of claim 10, wherein said metal coating comprises aluminum.

14. The packaging laminate of claim 10, wherein said first and second plastic layers each comprise a plastic selected from the group consisting of polypropylene, polyester, polyethylene, polyamide, polystyrene, and polyvinyl chloride.

15. A method of producing a packaging laminate, comprising:

(a) depositing a metal coating on one side of a first plastic layer by vacuum deposition;

(b) depositing a silicon oxide coating consisting of $SiO_x$, where x may be from 1.8 to 2.2, on one side of a second plastic layer by vacuum deposition;

(c) bringing said metal coating and said silicon oxide coating into close contact; and (d) applying an adhesive layer between said metal coating and said silicon oxide coating while bringing them into close contact, wherein said packaging laminate is endowed with tailor-made gas and light barrier properties by mutually regulating the respective thicknesses of said metal and silicon oxide coating.

16. The method of claim 15, wherein said vacuum deposition is chemical plasma vacuum deposition.

17. The method of claim 15, wherein said metal coating is deposited in a thickness of about 10–1000Å and said silicon oxide coating is deposited in a thickness of about 10–2000Å.

18. The method of claim 15, wherein said metal coating comprises aluminum.

19. The packaging laminate as claimed in claim 1, wherein said first and second vacuum-deposited layers are deposited by chemical plasma vacuum deposition.

20. The packaging laminate as claimed in claim 10, wherein said first and second vacuum-deposited layers are deposited by chemical plasma vacuum deposition.

\* \* \* \* \*